United States Patent Office 3,348,644
Patented Oct. 24, 1967

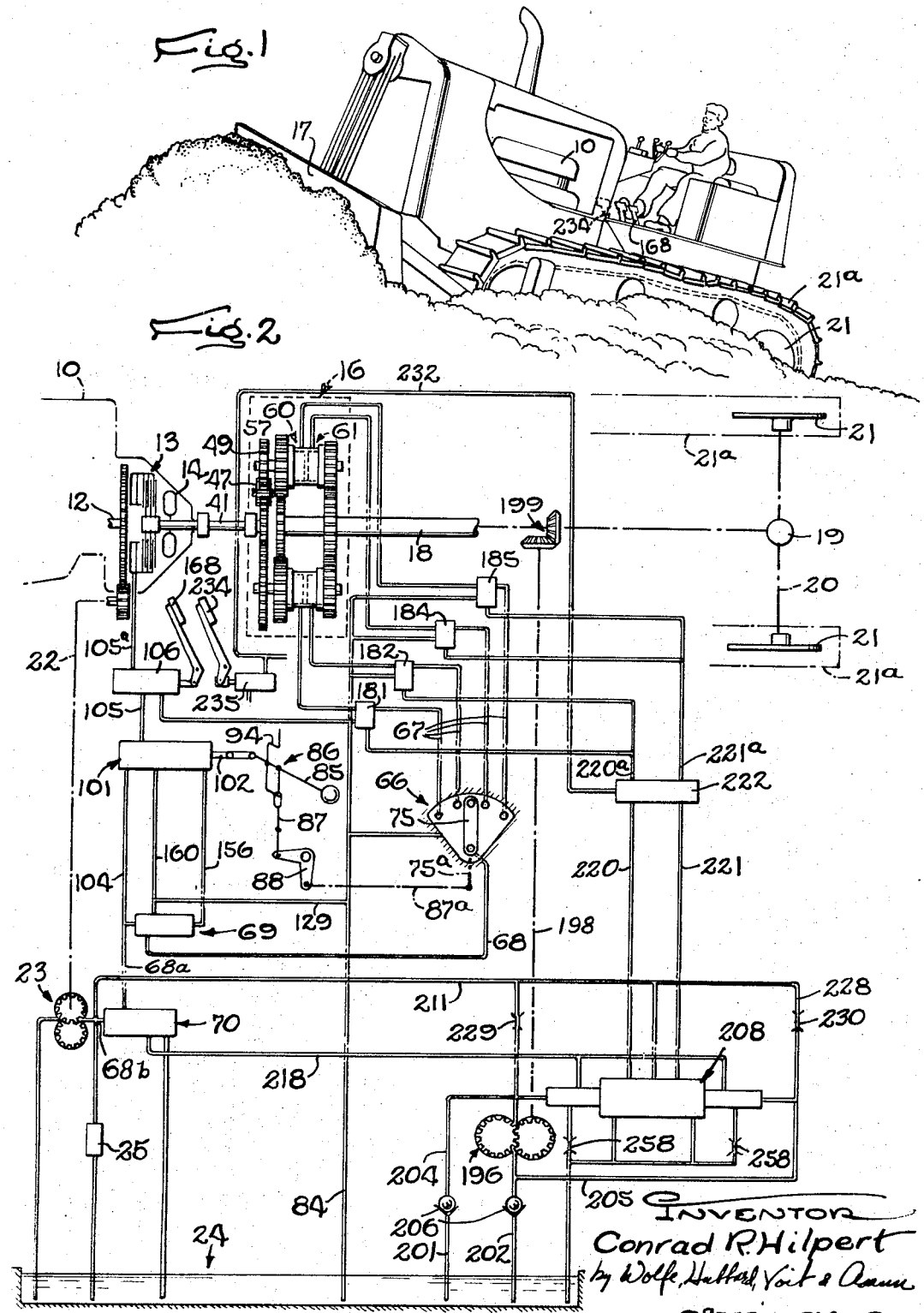

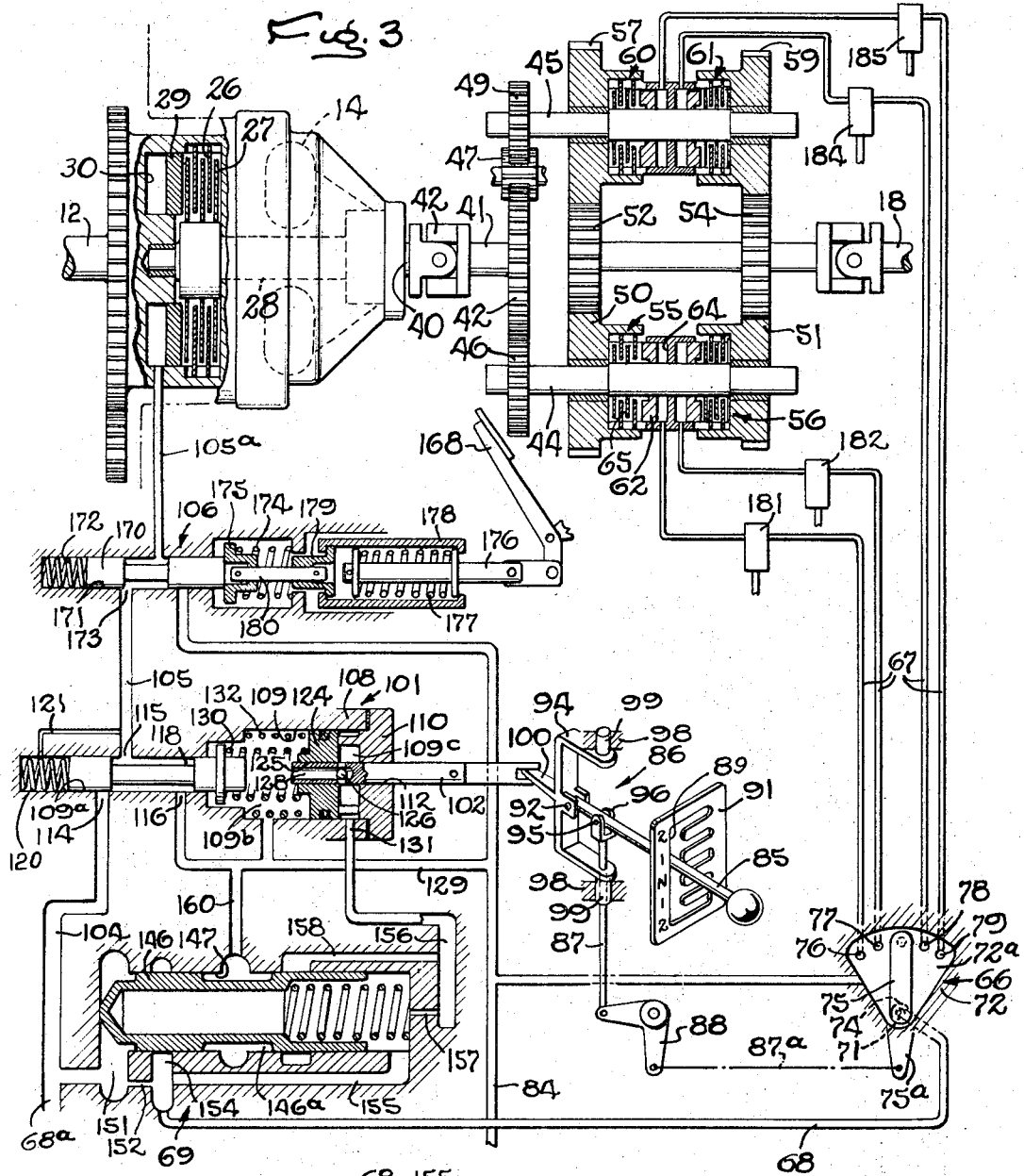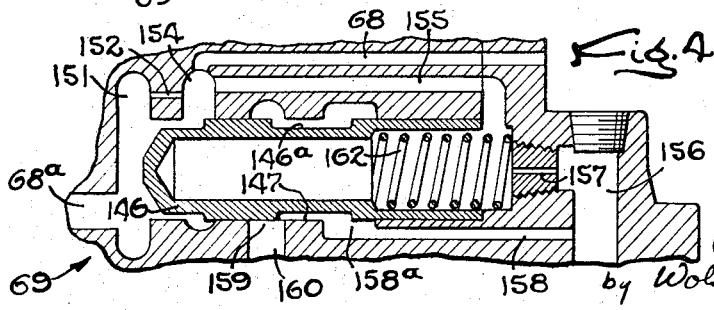

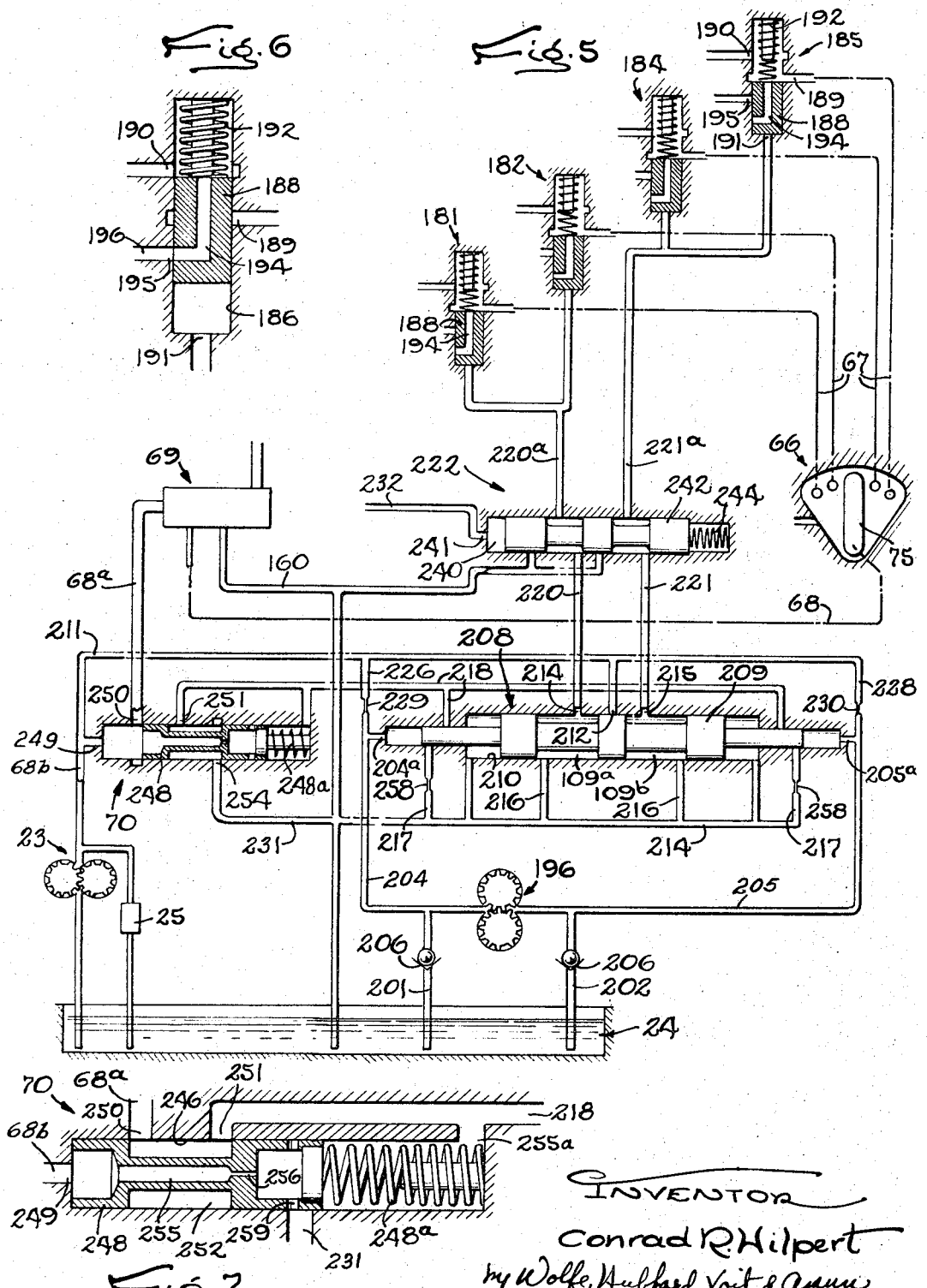

3,348,644
CONTROL FOR A POWER DRIVE SYSTEM AND INCLUDING SHIFT-RESTRICTING INHIBITORS FOR A REVERSIBLE TRANSMISSION
Conrad R. Hilpert Winnebago, Ill., assignor to Twin Disc Clutch Company, Racine, Wis., a corporation of Wisconsin
Filed July 19, 1965, Ser. No. 473,148
22 Claims. (Cl. 192—4)

ABSTRACT OF THE DISCLOSURE

A hydraulic control for a tractor transmission and including speed and direction responsive inhibitors which delay engagement of hydraulically actuated clutches for reversing the direction of drive of the vehicle until the tractor has slowed to a safe speed thereby to allow manual shifting of a selector lever to an opposite drive direction at any time without overstressing the transmission. Under special operating conditions, the inhibitors are disabled partially so as to leave the tractor free to maneuver and reverse directions in a manner required by the operation being performed. In addition, the inhibitors are disabled automatically if the brake system of the tractor should fail so that, regardless of the speed or direction of the tractor at the time of such failure, the transmission can be shifted to a condition to stop the tractor without the restrictions normally imposed by the inhibitors. A ground-driven hydraulic pump serves as a speed and direction sensor for the inhibitors, and also may be used to energize the clutches while the tractor is being pushed by another vehicle to start the engine.

Background of the invention

This invention relates to a control for a power drive system for transmitting energy from a prime mover to a load through a reversible drive transmission. More particularly, this invention relates to a control for regulating the energization of the various actuators to selectively complete and interrupt the drive train connecting the prime mover and the load and establish forward or reverse drive of the load during both start-up and normal operation of the power system.

In the operation of crawler type tractors such as bulldozers, the engine is preferably operated at a substantially constant speed to drive hydraulic pumps and the like for powering auxiliary power-operated equipment, such as a hydraulically actuated earth scoop. Yet, it is also desirable to make the vehicle as maneuverable as possible so that it can be driven in either direction and at various speeds depending upon the job to be accomplished. For changing the drive speeds and direction, a reversible multi-drive-ratio transmission is utilized which may be shifted to various forward and reverse drive ratios to drive the vehicle at the desired speed while the engine is run at a substantially constant speed.

While hydraulic actuators perform most of the physical work involved in maneuvering the vehicle, the operator still must make the proper selections of speed and direction and concern himself with whether he will overstress the power system in shifting to a reverse direction drive during the many direction changes that take place. He must make the decisions concerning proper shifting and speed selection while performing work tasks with a bulldozer which requires manipulation of the many auxiliary drives, all of which becomes quite demanding of his time and concentration while being bounced around on the machine.

Also, such vehicles as bulldozers, because they are usually left outside and exposed to the weather, must frequently be pushed by another vehicle to start the engine. Where the drive train includes hydraulically operated clutches and the like to engage the drive train, these must be engaged before the drive train is connected to turn the engine over by rotation of the driving wheels making a push-to-start operation impossible without some other means such as ground driven pumps for supplying pressure fluid to the clutches. Thereafter such auxiliary pumps usually are disabled or otherwise by-passed from the hydraulic system by the operator manipulating certain controls and are not used during much of the operating time of the bulldozer. So the operator must also be concerned with regulating both the ground driven pump and the engine driven pump to assure that they are properly connected and disconnected from the system.

Summary of the invention

The general aim of this invention is to lessen the demands on the operator who controls such a power drive system by providing a new and improved control which performs many of the control functions automatically. More particularly, it is an object of this invention to make it possible for the operator to control the starting, stopping, direction of drive, and drive ratio of such a vehicle simply by slamming a control member from one drive position to another without worry about whether or not the power drive system will be overstressed even if the new drive ratio selected involves a drive direction change.

A more particular object of this invention is to substantially lessen or eliminate shock and wear on the power system during shifting to drive in an opposite direction with novel inhibitors preventing the engagement of the drive train until the vehicle is going at a speed at which it is safe to do so.

A further object is to provide a control for a power system which inhibits shifting to drive in a direction opposite to that in which the vehicle is traveling as indicated above, but so as not to limit the maneuverability of the vehicle, and which also permits the operator to disengage the drive train and allow the vehicle to roll in the opposite direction, and thereafter to reengage the drive train to stop the vehicle and again power it in the original direction without shifting the drive ratio of the transmission, even though the vehicle may be rolling back in the opposite direction at the time of such reengagement.

Another object of this invention is to provide means for disabling the inhibit shifting control automatically under special emergency conditions, such as failure of the brake system, where shifting to a reverse direction may be helpful in stopping or otherwise regaining complete control over the vehicle.

A further object of this invention is to provide a control for a vehicle having hydraulically actuated clutches for connecting the drive train, which allows the vehicle to be pushed in either direction for starting by providing an auxiliary pressure fluid supply system which is automatically activated when the engine is not running, and which is automatically deactivated only when the engine driven supply system reaches a condition where it can supply the necessary pressure fluid for proper operation of the vehicle.

An even more specific object of this invention is to provide a control for a power drive system having a ground driven hydraulic pump for energizing the actuators during push-to-start operation regardless of which direction the vehicle is pushed. The control automatically connects the pump for use in the inhibit control after the prime mover is started for sensing the direction of drive of the vehicle, thereby taking full advantage of the pump during both start-up and normal operation of the power system.

Brief description of the drawings

FIGURE 1 is a pictorial illustration of a bulldozer representing one application for the subject invention;

FIG. 2 is a diagrammatic illustration of a drive system for a bulldozer or the like, utilized with an exemplary embodiment of the invention;

FIG. 3 is a diagrammatic illustration of the drive system and control of FIG. 2 showing some of the control components in more detail;

FIG. 4 is a cross-sectional view of a flow sensing valve used in the control of FIG. 3 with the valve member in moved position;

FIG. 5 is a partial cross-sectional view of the inhibit portion of the control;

FIG. 6 is an enlarged cross-sectional view of the blocking valves shown in FIG. 5 with the valve member in a moved position;

FIG. 7 is an enlarged cross-sectional view of the unloading valve shown in FIG. 6, with the valve member in a moved position.

Detailed description

While the invention has been shown and will be described in connection with an exemplary preferred embodiment, it will be understood that it is not intended to limit the invention thereto, but it is intended to cover all modifications and alternative constructions falling within the spirit and scope of the invention as expressed in the appended claims.

In FIGS. 2 and 3 is shown an embodiment of a power drive system adapted for powering a load such as the ground tracks of a bulldozer shown in FIG. 1 which is most generally used to move and pile earth and like jobs where frequent starts, stops and reversals of drive direction are common. Motive power is transmitted from an output shaft 12 of a prime mover or engine 10 through a modulated clutch 13, a torque convertor 14, and a multi-ratio, reversible drive transmission 16 to an output shaft 18 coupled to the driven load, which in this instance are the tracks of the bulldozer shown. In the following description it will be assumed for purposes of discussion that the output shaft is connected through appropriate steering means (not shown), a differential 19 and an axle shaft 20, to the drive wheels 21 of endless tracks 21a for a crawler type bulldozer, these latter elements being well known. The engine 10 is a diesel or any other suitable type, and it preferably is operated at a substantially high constant speed to supply sufficient input energy to auxiliary power systems through such drive means as an auxiliary drive shaft 22, directly connected to the drive train between the engine and the modulated clutch so that disengagement of the modulated clutch does not disengage the auxiliary system. An example of such an auxiliary power system is an engine driven pump 23 (FIG. 2) and associated fluid pressure supply including the sump 24 and the pressure regulator 25. This engine pump supplies pressure fluid for actuating the modulated clutch and brakes, as well as for such systems as hydraulic means for raising and lowering, or tilting and retracting an earth scoop 17 (FIG. 1).

The modulated clutch 13 is designed to operate continuously with any degree of slippage, determined by the pressure with which its interleaved friction plates are pressed together. This clutch is sturdily constructed and capable of engaging and disengaging under full speed and load, particularly because of the cushioning effect of the tandem-connected torque convertor 14. Further details regarding the modulated clutch, and the cooling thereof may be had by reference to the co-pending application of Conrad Hilpert, Ser. No. 187,741, filed Apr. 16, 1962 and now Patent No. 3,202,018. It will suffice here simply to observe that interleaved sets of friction discs 26 and 27 (FIG. 3) respectively splined to the engine flywheel and the torque convertor input shaft 28 are urged into engagement by a modulating actuator including a piston member 29 which is urged to the right with a force in proportion to the pressure of hydraulic fluid introduced into an annular chamber 30. The greater the pressure in that chamber, the more the piston is forced to increase the frictional engagement of the discs, resulting in less slippage of the latter and an increase in the driven speed of the torque convertor input shaft relative to the speed of the engine shaft 12.

The torque convertor 14 may be one of several known types having a fluid reservoir and rotating vanes for torque transmittal between the convertor input shaft 28 and a convertor output shaft 40. The output shaft 40 connects with a transmission input shaft 41 through a universal coupling 42. The multi-ratio transmission 16 may take any one of a variety of specific forms, but in general terms it includes a plurality of clutches engageable in different patterns or combinations to establish selectively any one of a plurality of drive ratios between its input shaft 41 and the output shaft 18. As here shown, the input shaft 41 is formed with an input gear 42 which drives forward and reverse layshafts 44 and 45. Such drive of the forward layshaft occurs directly through a spur gear 46, while drive of the reverse layshaft is through an idler gear 47 to a spur gear 49. The two layshafts are thus driven in opposite directions.

To provide two ratios of forward drive, two gears 50 and 51 are journaled on the layshaft 44 and respectively mesh with gears 52 and 54 rigidly carried on the output shaft 18. Multi-disc clutches 55 and 56 are selectively engageable to connect the gear 50 or the gear 51 to the layshaft 44, thereby to establish first or second forward drive ratios. Similarly, two gears 57 and 59 journaled on the reverse layshaft mesh with gears 52 and 54 fixed on the output shaft and are selectively locked to the reverse layshaft by engagement of clutches 60 or 61, respectively, thereby to drive the output shaft 18 in a reverse direction with either of two ratios. Thus, by engaging clutches 55, 56, 60 or 61, the transmission 16 is set to produce first forward, second forward, first reverse, or second reverse drive ratio between the input shaft 41 of the transmission and the output shaft 18 of the power system. Each of the four transmisison clutches is associated with a selectively energizable actuator to control its engagement or release. While these and other actuators shown and used in the example can be either mechanically or electrically energized, in the embodiment shown each such clutch includes a piston 62 movable within a chamber 64 in response to the introduction of pressure fluid into the chamber so as to compress and drivingly engage the interleaved friction discs 65.

The admission of pressure fluid from the engine pump 23 into any one of the four clutches, or the venting of fluid from the clutches back to the sump 23, is controlled by regulation of a selector valve 66 which is connected to each of the piston chambers 64 by a hydraulic conduit 67. To transmit pressure fluid to the valve, fluid conduits 68 and 68a connected by a flow sensing valve 69 (FIG. 2), extend between an outlet port on the engine pump and an inlet port 71 in the housing 72 of the valve. Journaled to pivot about a shaft 74 is a hollow selector pipe 75 which is alined to receive fluid from the inlet port and transmit it to one of the outlet ports 76, 77, 79 or 80 each connecting with one of the conduits 67, and each positioned to aline one at a time with the mouth of the pipe 75 as it is pivoted about the shaft. A detent mechanism (not shown) holds the selector pipe in alinement with each port after it is so positioned. By alining the pipe with one of the outlet ports, pressure fluid is supplied from the conduit 68 to a conduit 67 to activate one of the transmission clutches and thus shift the transmission to the associated drive ratio. At the same time the other outlet ports are opened to an interior cavity 72a in the housing which is connected by a conduit 84 to the sump 24, thereby assuring that the other piston chambers are not pressurized.

To shift the drive ratio of the transmission, a control member in the form of a handle 85 (see FIG. 3) is connected through a control assembly 86 and rods 87 and 87a acting through a bellcrank 88 to move an extension 75a on the selection pipe of the selector valve. The handle may be moved by the operator into various slots or positions within an aperture 89 in a control plate 91, corresponding to the second reverse, first reverse, neutral, first forward and second forward drive ratios of the transmission. The handle is pivotally attached to a yoke 94 by a pin 92 and to a yoke 96 supported on the end of rod 87 by a pin 95. The yoke 92 is pivotally supported by trunnions 99 journalled the frame 98 and providing a bearing for the rod 87 at the bottom such that sidewise movement of the handle pivots the yoke and an attached ear 100 about a vertical axis, while vertical movement of the handle moves the rod 87 up and down to actuate the selector valve.

Movement of the handle 85 to shift the transmission drive ratio also automatically disengages the modulated clutch to disconnect the drive train during the time the transmission is being shifted. For this purpose, a pressure regulating means in the form of a modulated clutch control valve 101 is connected by a rod 102 to the ear 100 on the control arm 85. This control valve receives pressure fluid from the engine pump through hydraulic lines 104 and 68a connected through an unloading valve 70, and is connected with the modulating actuator of the modulated clutch by hydraulic lines 105, 105a connected through a decelerator valve 106.

As shown in FIG. 3, the control valve 101 includes a housing 108 in which an elongated internal cavity 109 is formed opening to one end of the housing with this open end closed by an end cap 110 fastened to the housing and including a cylindrical opening 112 extending therethrough and alined with the cavity. The portion 109a of the cavity opposite to the cap is cylindrically shaped with a pressure fluid inlet port 114, a pressure fluid outlet port 115 and a sump port 116 connecting therewith. A valve spool 118 is disposed for movement back and forth in the cavity, with movement to the right (see FIG. 3) closing off the inlet port, and movement to the left uncovering the inlet port and allowing fluid to pass to the outlet port, with the pressure of the flow from the outlet port being equal to the pressure of the fluid entering the inlet port minus the pressure drop at the inlet port, as determined by the positioning of the spool. Fluid at outlet port pressure is transmitted through a passage 121 connecting the outlet port 115 to the end of the cavity 109a, which exerts a force on the spool urging it to the right. This fluid generated force requires that the force necessary to move the spool to the left to open the inlet port be directly proportional to the pressure of the fluid passing through the outlet port, plus the relatively small force exerted by a spring 120 acting to move the spool to the closed position.

To actuate the spool with movement of the handle 85, the rod 102 connecting with the ear 100 on the control assembly extends through the opening 112 in the end cap and passes through a center opening 125 in a pressure rise piston 124 positioned for reciprocating movement in the enlarged right end of the internal cavity 109 of the valve, and dividing it into a sump cavity 109b and a pressure cavity 109c. A conduit 129 connects with line 84 to vent the sump cavity 109b to the sump. A series of orifices 126 in the side of the rod connects with an internal passage 128 extending through the rod to the sump cavity. Positioned between the pressure rise piston and the spool is a spring 130 which transmits a force to the spool proportional to the positioning of the piston, with the force increasing as the piston is moved to the left in the cavity.

For opening the valve, that is, to move the spool to the left to decrease the pressure drop across the inlet port and thus increase the pressure passing through the outlet port, pressure fluid is introduced into the cavity 109c through a pressure fluid inlet 131 which forces the pressure rise piston to the left tending to compress the spring 130. The spring, in being compressed, exerts an increasingly larger force on the spool moving it to the left. Movement of the piston ceases when flow occurs through the orifices 126 and passage 128 in the rod to the cavity 109b to thereafter hold the fluid pressure in cavity 109c constant. The fluid pressure in cavity 109c stabilizes at that necessary to exert a sufficient force on the piston which by acting through the spring 130, balances the opposing forces on the spool resulting from the spring 120 and the pressure of the outlet port fluid in the spring cavity acting to move the spool to the right.

After the piston reaches this equilibrium position where the forces on the spool are equal, both the spool and piston remain substantially motionless, since an increase in the forces on the piston in either direction merely moves the piston to uncover or cover the orifices 126 and thus cause an increase or decrease in the pressure of the fluid in cavity 109c sufficient to offset the change in force. Movement of the rod in either direction covers or uncovers the orifices 126 which causes a pressure change in cavity 109c resulting in the piston being moved to a new position even with the orifices 126 which changes the forces acting to move the spool to the left and thereby repositions the spool to effect a different pressure regulation on the fluid passing through the valve. A return spring 132 acts to return the piston to the right when the pressure in cavity 109c is decreased.

By this construction, all the force for moving the spool to the left against the action of the outlet fluid pressure is supplied by the pressure fluid introduced in the pressure cavity 109c, and the only force necessary to actuate the valve is that necessary to move the rod. Also, the handle 85 and rod 102 remain where positioned unless physically moved by actuation of the handle since the actuating forces for the valve 101 are provided by the pressure fluid and no other forces are exerted on the rod urging it in either direction.

From the foregoing it can be seen that movement of the handle 85 sidewise to move rod 102 back and forth regulates the pressure drop across the valve 101 to vary the pressure of the fluid supplied to the modulating actuator. In this manner the degree of engagement of the modulated clutch is controlled by moving the handle sidewise in any one of the drive ratio selection slots in the plate 91. Movement of the handle to the left far enough that it can be moved vertically to another slot moves rod 102 to its right limit of travel which permits the spool ot completely close the inlet port 114, as shown in FIG. 3, thereby automatically disengaging the modulated clutch as an incident to shifting the drive ratio of the transmission.

By this control, the modulated clutch is held disengaged until the transmission clutches are engaged during a drive ratio shift of the transmission, thus assuring that the shock of connecting the drive train is absorbed by the modulated clutch rather than the transmission clutch. For this purpose means are provided for sensing when the transmission is engaged, by sensing when the transmission clutch associated with the drive ratio selected is engaged, and the modulated clutch is held disengaged until this means signals the transmission clutch is engaged. To sense when the transmission clutch is engaged, a flow sensing valve 69 is connected between the conduits 68, 68a (FIG. 2) which transmit the pressure fluid for activating the transmission clutches. This valve is actuated from a first condition, where a valve member 146 is positioned to the left in a valve cavity 147 (as shown in FIG. 3) to a second condition where the valve member is shifted to the right (as shown in FIG. 4) by fluid flowing to the transmission clutches. Conduit 68a transmits pressure fluid from the pump 23 to a conduit 151 in the housing adapted to be closed to fluid flow when the valve member is in the furthermost position to the left. An orifice 152 connects the downstream end of conduit 151 with a port 154 leading to the valve cavity, with conduit 155 leading from port 154 to the right end of the cavity. Pressure fluid is carried from the flow sensing valve to the selector valve by conduit 68 connecting with port 154 while a conduit 156 connecting through an orifice 157 to the valve cavity conducts pressure fluid to the inlet port 131 of the valve 101 for actuation of the pressure rise piston. A conduit 158 connects conduit 156 to port 158a positioned adjacent a port 159 which alines with an indent 146a in the side of the valve member. This indent is positioned to permit fluid flow between ports 158a and 159 when the valve member is actuated to the right. A conduit 160 connects port 159 to the conduit 129 leading to the sump.

In operation, assuming there is no fluid flow through conduits 151 and 68, i.e., while pressure fluid may exist therein, it is static, the valve member upstream of the orifice 152 exposed to conduit 151 and the downstream side of the valve member connecting with conduit 155 are exposed to equal fluid pressures, permitting a spring 162 to hold the valve member in the left position (see FIG. 3). With the advent of fluid flow through conduit 70, resulting from opening the selector valve to permit momentary fluid flow to one of the clutch actuators, the pressure on the downstream side of the valve member drops thus lowering the pressure of the fluid in conduit 155 and causing a difference in fluid pressure on the upstream and downstream sides of the valve member. Since the pressure in conduit 151 is now higher, the valve member is moved to the position shown in FIG. 4. Fluid flow now passes through passage 151, orifice 152 and on through the conduit 68, with the pressure drop across the orifice still resulting in unequal fluid pressures acting on the valve member to urge it to the right. The valve member now moves past port 154 to partially by-pass fluid flow around the orifice 152 and increase the flow through conduit 68 for quicker actuation of the transmission clutch. After the selected transmission clutch is fully engaged, the flow to the associated actuator ceases and the pressure on the downstream side of orifice 152 rises to equal that in conduit 151, thereby equalizing the fluid pressures acting on the valve member to allow it to move back to the left position, with movement of the valve member to the left signaling that the transmission clutch is engaged.

With movement of the valve member to the right, fluid flow is permitted from the port 158a to the port 159 through the indent to thereby connect the conduits 156 and 158 to the sump and dump any pressure fluid in cavity 109c. The modulated clutch, which was already disengaged by movement of the handle 85, is thereby held disengaged. When the flow through conduit 68 ceases, indicating that the shifting of the transmission is completed, the valve member again moves to the left, pressure fluid may again build up in the control valve cavity 109c as heretofore described, and the modulated clutch is thereby engaged. To ease the strain of connecting the drive train, the modulated clutch is engaged slowly and for this purpose pressure fluid flow to the cavity 109c of the valve 101 for opening the valve and engaging the modulated clutch, must pass from the conduit 68a to the conduits 155, the valve cavity and conduit 156 through the orifice 157, with the orifice limiting the rate of flow to effect a slow opening of the modulated clutch control valve.

To provide added versatility in the control system by allowing the operator to decelerate or reduce the ground speed of the bulldozer by actuation of a foot operated control member, a foot pedal 168 is provided (see FIG. 3) which may be depressed to selectively reduce the degree of engagement of the modulated clutch. Actuation of the foot pedal progressively closes an associated deceleration valve 106 to reduce the pressure of the fluid passing therethrough to the modulating actuator in a manner similar to that of the control valve, with the exception that the pressure regulation is proportional to the actuation of a foot pedal on the bulldozer, and this valve is spring biased so that when the pedal is released it will open. This deceleration valve includes a spool 170 positioned in spool cavity 171 which, when moved in the right under the force of a spring 172, progressively closes an inlet port 173 connecting with conduit 105 to effect a pressure drop on the pressure fluid passing through conduits 105 and 105a connecting with the modulating actuator of the modulated clutch. The pressure drop is proportional to spool movement to the right, which is effected by depressing the clutch pedal. Normally the spool is held in the left position by a spring 174 acting through a piston 175, since spring 174 is made to exert a greater force than spring 172. Pressing on the pedal acts through a rod 176, a spring 177, a sleeve 178, a piston 179 and a rod 180 to move piston 175 to the right and compress the spring 174. The spring 172 is then permitted to move the spool 170 to the left, with the amount of movement determining the pressure drop impressed on the fluid passing through the valve thereby regulating the degree of engagement of the clutch by regulation of the pressure of the fluid passing to the modulating actuator. By depressing the pedal 168 fully, the port 173 is closed to completely disengage the modulated clutch.

In accordance with one feature of the invention, the operator may slam the shifting control handle 85 from any drive ratio to any other drive ratio, whether forward or reverse, without concern about the speed or direction the bulldozer is then moving. However, if the shift involves a change in the direction of drive, that is, if the new drive direction selected is opposite to that in which the vehicle is then moving, the control inhibits the actual shifting until the ground speed is reduced to a safe predetermined value, at which time the control effects the shifting.

To inhibit shifting to an opposite direction at an unsafe speed, means are provided to detect and signal the direction the vehicle is then moving and, when movement of the shifting handle initiates a change in the transmission drive ratio, means responsive to such signaling prevents shifting to any drive ratio which will drive the output shaft and ground wheels in the opposite direction and thus severely shock and strain the power drive system. The detection means shown in this exemplary embodiment is a reversible hydraulic pump 196 (FIG. 2) which is driven directly by the output shaft 18 and which supplies a signal in the form of a pressure fluid flow indicative of the direction the shaft is turning, and thereby indicative of the direction the vehicle is moving. The means responsive to this pressure fluid flow takes the form of blocking valves in the pressure fluid lines connecting with the individual transmission clutches to prevent their engagement when not desirable. As shown in FIG. 3, blocking valves 181, 182, 184 and 185 are connected in the pressure lines 67 leading to the transmission clutches, with the former two valves associated with the forward drive ratio clutches and the latter two associated with the reverse drive ratio clutches. These valves each include an internal cavity 186 (see FIGS. 5 and 6) in which is positioned a valve member 188. An inlet port 189 and an outlet port 190 connect in the conduit 67 such that, with the valve member in the position illustrated in FIG. 5, pressure fluid may pass through the cavity between the inlet and outlet ports for activating the associated transmission clutch.

With movement of the valve member to the position shown in FIG. 6, the inlet port 189 is closed to prevent flow between the ports and thereby prevent engagement of the related clutch. To actuate the valve member for closing the inlet port, a signal in the form of pressure fluid introduced into a port 191, exerts a force on the valve member sufficient to overcome the force of a spring 192 and thus to move it upward past the inlet port. An internal passage 194 in the valve member is positioned to communicate with a second outlet port 195 connecting with a conduit 196 leading to the sump, to relieve any pressure fluid from the portion of the conduit 67 leading to the clutch actuator and thereby assure that the associated clutch is disengaged when a blocking valve is closed.

To supply the pressure fluid for actuation of the appropriate blocking valve to the closed position, means are provided for sensing and signaling the direction the bulldozer is moving, by sensing the direction of the rotation of the output shaft 18 coupled directly to the ground wheels. In this embodiment the sensing means takes the form of a reversible hydraulic pump 196 (see FIGS. 2 and 5) which is driven by a shaft 198 coupled to the output shaft 18 by a pair of mated gears 199. Thus the pump 196 is ground driven in that it is directly coupled to the output shaft to be driven in the forward and reverse directions with rotation of the ground wheels of the bulldozer.

Depending upon which way the pump 196 is being driven, it receives hydraulic fluid from the sump 24 through conduits 201 or 202 connecting with conduits 204, 205 leading to the pump. One-way valves 206 are positioned in the conduits 201, 202 to prevent fluid passing through the outlet side of the pump from returning directly to the sump. Conduits 204, 205 transmit pressure fluid from the ground driven pump to the opposite ends of an inhibit valve 208 which, depending on which way the pump is being driven, is actuated to a first or second position, thereafter directing pressure fluid to actuate the forward drive or reverse drive blocking valves, respectively. The inhibit valve includes a spool 209 positioned to be moved endwise in the cavity 210, with the spool moved to the left end or first position when the pump 196 is being driven in the direction corresponding to forward motion of the vehicle, since fluid is pumped up through conduit 201 and out through 205 to the right end port 205a of the valve. Conversely with the vehicle going backwards, pump 196 supplies pressure fluid through conduit 204 to the left end port 204a of the inhibit valve to act on the spool and urge it to the right end.

Pressure fluid from the engine pump 23 is supplied through conduit 211 to port 212 of the inhibit valve such that with the spool moved to the right position, pressure fluid is supplied through the indent 109a to a port 214 and with the spool moved to the left position, pressure fluid is supplied through indent 109b to a port 215. Connecting with these ports are conduits 220, 221 connected through a shut-off valve 222 to conduits 220a, 221a respectively. By this arrangement forward drive of the ground driven pump 196 actuates the spool 209 to the left and causes pressure fluid to be supplied to actuate the reverse inhibit blocking valves 184, 185, and reverse drive of the ground driven pump causes pressure fluid to be supplied to actuate the forward inhibit blocking valves 181, 182. Conduits 216 connect one port 214 or 215 not being supplied with pressure fluid to conduit 84 leading to the sump to assure that no pressure fluid exists in the inhibit blocking valves corresponding to the direction the vehicle is moving. With the ground driven pump being driven in either direction, actuation of the spool valve to one end or the other of the cavity immediately connects the output of the ground driven pump to the sump through conduits 217 connecting through conduit 214 to the sump, and through conduits 218 connecting through the unloading valve 70 and conduit 231 to the sump. The inhibit valve thereby unloads the pump to greatly reduce power losses in the system.

Also during the time the vehicle is standing still and the ground driven pump is not being rotated, the spool 209 of valve 208 is automatically centered in the position shown in FIG. 5. This is accomplished by supplying pressure fluid from the engine driven pump through conduit 211 to both ends of the valve through connecting conduits 226, 228. With the spool centered, the conduits 217 at each end of the valve are closed and equal pressure exists at both ends of the spool. If one conduit 217 is opened by the spool not being positioned in the center, flow exists therethrough to drop the pressure at that end of the spool, and by the use of orifices 229 and 230 to limit the flow thereto, the pressure fluid at the opposite end of the spool exerts a force tending to move the spool to the center position until the pressure is equalized by both conduits being closed. In the system just described, the blocking valves are actuated immediately upon the ground driven pump being actuated, however, by limiting movement of the spool until the output of the pump reaches a certain predetermined speed other than anything greater than zero speed as here, the speed at which the inhibit control functions may be varied.

In accordance with another feature of this invention, under certain emergency conditions the inhibit control may be disabled so that shifting to a drive direction opposite to the existing direction of movement of the vehicle is allowed. Such a condition may exist where the brakes fail thereby making it desirable to shift to a reverse direction to stop movement of the bulldozer. For this purpose, the shut-off valve 222 is connected between the inhibit valve and the blocking valves which, in response to a signal indicating operating conditions of the power system make it desirable to shift to a reverse direction, that is, the brakes fail, shuts off all actuating fluid flow to the blocking valves to disable the inhibit system.

In this exemplary embodiment, the shut-off valve is connected to the brake line 232 (FIGS. 2 and 5) receiving pressure fluid from a suitable source (not shown) for activation of the brake. One brake (not shown) is associated with each end of the axle shift 20, which may be engaged by selectively depressing either a left or right brake pedal 234. For instance, to turn the vehicle right, the right pedal 234 is pressed to open a valve 235 and permit pressure fluid to pass from line 232 to the brake actuator to slow rotation of the right end of axle 20. A minimum fluid pressure is maintained in the brake line 232 at all times, and the absence of pressure fluid signals a brake failure. This pressure fluid is supplied to the left end of cavity 240 of the shut-off valve through a port 241 (FIG. 5) which ordinarily maintains a spool 242 at the right hand position in the cavity as shown in the drawing. In this position a spring 244 is compressed and conduits 220, 221 communicate with conduits 220a, 221a permitting normal functioning of the inhibit control. In the absence of pressure fluid in line 232, the spool is moved to the left position by the spring 244 to close off fluid flow to the conduits 220a, 221a while simultaneously connecting these conduits to the sump through conduits 223 and 160. This automatically disables the inhibit control with the occurrence of a condition in the power system indicating the desirability of being able to shift to a reverse drive ratio.

In accordance with another feature of the invention, the often used "rollback" maneuver is made possible by this control. By this maneuver, the bulldozer is driven forward or backward up a hill, then by disengagement of the modulated clutch, allowed to roll back, followed by subsequent engagement of the modulated clutch which stops and again drives the bulldozer uphill. Such a maneuver is used frequently in such tasks as piling earth, and by this control may be performed even though the inhibit control would normally prevent it.

Means are provided for disabling the inhibit control so long as the transmission is not shifted to a new drive ratio. By constructing the blocking valves 181, 182, 184 and 185 such that, with the existence of pressure fluid in one of the lines 67, the associated valve cannot close, the valves themselves serve as disabling means to prevent the inhibit control from functioning if the clutch is already engaged. When the blocking valves are in the position shown in FIG. 5 and pressure fluid flow is introduced in one of the conduits 67, for instance through valve 181 thereby shifting the transmission to the second forward drive ratio, the presence of this pressure fluid in the valve cavity above the valve member 188 exerts a force on the valve member tending to hold it in the down, or open, position. Acting additively with this fluid exerted force is the force of the spring 192. If the modulated clutch is released now, assuming the vehicle is being driven uphill, the bulldozer will roll backwards. This drives the ground driven pump 196 in the reverse direction which moves the spool of valve 208 to the right, and permits pressure fluid to flow from conduit 211, via port 212, port 214 and conduits 220 and 220a which ordinarily would actuate the forward inhibit blocking valves 181, 182 to the closed position. However, since the pressures of the fluid acting on both sides of the valve member of valve 181, i.e., that entering port 191 from the inhibit valve and that entering port 189 from the selector valve, are substantially the same, because they both stem from the unloading valve, and since the spring 192 is also acting to hold the blocking valve member in the open position, the valve is prevented from closing. By this arrangement, even though the bulldozer is moving backward the operator can still reengage the drive train by engaging the modulated clutch to drive the vehicle forward. Of course the same would be true also if the vehicle were permitted to roll forward while the transmission is engaged in a reverse drive ratio.

This maneuver is permitted because the modulated clutch is constructed to withstand the shock of stopping the vehicle prior to powering it in the opposite direction. However, any action by the operator to shift to another drive ratio relieves the pressure in line 67 during the time the selector valve is being actuated and the blocking valve member is immediately permitted to move the closed position. Once in the closed position, the presence of pressure fluid in line 67 does not affect the blocking valve since it is prevented from entering the valve cavity. The operator must thereafter either shift to a drive ratio corresponding to the direction the vehicle is then moving or must brake the vehicle to a stop before he can shift to a reverse direction. This is desirable since under these circumstances of changing drive ratios the transmission clutches would be subjected to equalizing the speeds of two reverse rotating drive train components, i.e., the output shaft and coupled transmission components would be rotated backwards by the drive wheels, while in all probability the drive train between the modulated clutch and transmission clutch connected through the reverse gearing of the layshafts would be driving the attached clutch component in the opposite direction, thereby resulting in a greater than usual strain on the transmission clutch if it were engaged. For this reason once shifting is attempted, the inhibit control is again enabled to function in the manner heretofore described.

In bulldozers and similar earth moving equipment which are left outside frequently, the necessity to push-to-start the vehicle with another vehicle occurs frequently. While hydraulically actuated drive train components are desirable in reducing operator fatigue, problems are presented where the drive train must be engaged with the engine not running for permitting starting of the engine by rotation of the drive wheels. To meet the problem, ground driven pumps have been utilized in the past, however, the normal time of usage is very small since the pump is usually disabled during normal operation of the vehicle because an engine driven pump is more desirable for use when the engine is running, as the power output does not vary with ground speed.

In accordance with this feature of the invention, the ground driven pump for supplying the direction of movement signal for the inhibit control is utilized also to provide power for the hydraulically actuated components regardless of which direction the vehicle is being pushed until such time as the engine driven pump can supply sufficient power for such components. Thereafter, the ground driven pump is automatically disconnected from the main hydraulic system and reconnected for supplying the signal for the inhibit control heretofore described.

To meet these objectives, control means are provided for automatically connecting the engine driven pump to the hydraulic system for supplying pressure fluid thereto so long as the output pressure from the engine driven pump is above a predetermined amount, and if it falls below a predetermined amount, the ground driven pump is connected to supply pressure fluid to the system. In the exemplary embodiment, this automatic control means takes the form of an unloading valve 70 (FIGS. 5 and 7) having a valve cavity 246 with an included valve member 248 which, when the engine is not running, is normally held in the position shown in FIG. 7 by a spring 248a acting between the valve member and the other end of the cavity. When the valve is in the position shown in FIG. 5 output fluid from the engine driven pump passes from conduit 68b to conduit 68a through ports 249 and 250 for pressurizing the hydraulic system in the normal manner. Pressure fluid from the ground driven pump carried by conduit 218, after it passes through the inhibit valve, is transmitted to the sump through port 251, around the indent 252 of the valve member, and out of port 254 and connected conduit 231 leading to the sump. Thus the ground driven pump is unloaded and the engine driven pump is connected directly to the hydraulic system.

When the engine is stopped, the engine pump output drops along with that of the ground pump, and the spring 248 returns the valve member to the left position as shown in FIG. 7. When in this position, the engine pump is connected to the sump through a passage 255, an orifice 256, a port 259, port 254 and conduit 231. The ground driven pump is connected to the hydraulic system since port 251 now communicates with port 250 and conduit 68a. Pushing the vehicle drives the ground driven pump through rotation of the ground wheels and output shaft, which thereafter supplies pressure fluid to the system for engaging the modulated clutch and transmission clutches in accordance with the settings of the control members. Output fluid under pressure is also supplied through port 255a in the unloading valve to the spring cavity to exert a force on the valve member tending to hold it in this left position. During this period the inhibit valve spool will be moved to one end or the other in the valve cavity permitting some flow through conduits 217 and 214 although the sump restrictions 258 in conduits 217 limit this flow so that most of the flow from the ground driven pump passes through conduits 218.

After the engine starts, the output fluid pressure from engine pump 23 rises and enters the unloading valve through port 249 to exert a proportionally greater force on the valve member urging it to the right. The output fluid pressure from the engine pump is ultimately greater than that from the ground driven pump, therefore the force on the valve member exerted by the engine pump output fluid will begin movement of the valve member to the right. Initial movement in this direction closes off port 257 through which fluid from the engine pump has been passing to the sump, thereafter trapping all the engine pump output fluid in the valve. The valve member is immediately moved to the right with a positive action to permit flow between ports 249 and 250, thus connecting the engine driven pump to the hydraulic system and the ground driven pump to the sump as shown in FIG. 5 and heretofore described.

By this control arrangement, the ground driven pump is always automatically connected to the hydraulic system when the engine driven pump output pressure drops, for instance when the engine is stopped, and the engine driven pump is automatically connected to supply pressure fluid to the hydraulic system when its output pressure rises to a predetermined level. The ground driven pump thereby serves the duel purpose of signaling the inhibit control and pressurizing the hydraulic system during push-to-start operation.

*Summary of operation*

Assuming that the tractor is at rest and that it is necessary to push the tractor to start the engine, the unloading valve 70 is positioned as shown in FIG. 7 so that the ground pump will force pressure fluid into the system through ports 251 and 250 and conduit 68a. Since both sides of the ground pump are connected to the port 251 by conduits 226 and 228, fluid will be supplied to the system regardless of which direction the tractor is pushed.

After the engine has started, the pressure from the engine pump 23 shifts the unloading valve 70 to the position shown in FIG. 5 so that the system is operated at engine pump pressure. The ground pump 196 then is unloaded automatically and is connected to the sump through the conduit 231, the ground pump now serving only as a speed and direction sensor to actuate the inhibit valve 208. Once the inhibit valve has been shifted by the ground pump, the latter is connected to the sump through the unloading valve and conduits 217 thereby reducing power losses; and the inhibit valve is held in its shifted position by the pressure developed by the engine pump 23.

Assuming the tractor was pushed in a reverse direction to start the engine, the inhibit valve 208 (FIG. 5) is shifted to the right position and directs pressure fluid from the engine pump 23 to the forward blocking valves 181 and 182 thereby preventing engagement of the forward clutches 55 and 56 until the tractor has slowed to a safe speed. To shift the tractor to movement in a forward direction, the operator need only shift the lever 85 to a forward position without worry as to whether the tractor is traveling at a safe speed.

At this time, both the modulated clutch 13 and the engaged reverse clutch 60 or 61 are released. When the tractor slows to a predetermined safe speed, the inhibit valve shifts to its centered position (FIG. 5) thereby connecting the blocking valves 181 and 182 to the sump and relieving these valves of their inhibiting function. Thus, fluid may pass through the selector valve 66 to one of the forward clutches 55 or 56. Fluid flow to the forward clutch is sensed by the flow valve 69 and, when the flow is static, the valve shifts to allow fluid to pass to the modulated clutch 13 through the control valve 101. Accordingly, the modulated clutch is held disengaged until the forward clutch is engaged to insure that the shock of connecting the drive train will be absorbed by the modulated clutch. During forward travel of the tractor, the operator may, at his option, depress the decelerator pedal 168 to reduce the speed of the tractor.

If it is desired to perform a rollback maneuver while the tractor is traveling forwardly uphill, the operator simply shifts the control lever 85 to disengage the modulated clutch 13 without shifting the transmission to disengage the forward clutch. When the tractor has rolled reversely downhill to the desired position, the lever 85 is shifted to re-engage the modulated clutch to drive the tractor again uphill. The forward clutch remains engaged during rollback since the blocking valve 181 is held in the position shown in FIG. 5 by the fluid pressure above the valve member 188 and by the spring 192. Accordingly, the inhibit control is disabled to the extent that rollback is permitted without regard to the speed of the tractor.

Should the pressure in the brake system drop, the shutoff valve 222 immediately connects the blocking valves 181, 182, 184 and 190 to the sump. As a result, the transmission can be shifted to any condition necessary to help stop the tractor regardless of the direction the tractor may have been traveling when the brake system failed.

I claim as my invention:

1. In a system for driving a load from a prime mover, the combination comprising a transmission having input and output shafts coupled respectively to the prime mover and the load, said transmission having drive means engageable to produce drive of said output shaft in a given direction, an actuator and means responsive to activation thereof to engage said drive means, an activating fluid system connected to selectively activate said actuator and thereby set said transmission to drive the load in a given direction, means for sensing and signaling when the load is being driven in the direction opposite to said given direction, inhibit means responsive to signaling from said sensing means to prevent activation of said actuator, means to disable said inhibit means when said drive means is engaged prior to signaling by said sensing means, a brake system including means operable in response to receiving pressure fluid to retard rotation of said output shaft, a source of pressure fluid including means to selectively conduct pressure fluid to said retarding means to slow said output shaft, means for sensing the pressure of the fluid of said source and generating a second signal in response to said pressure being below a predetermined value, and means acting in response to said second signal for disabling said inhibit means and thereby allow said transmission to be set to drive the output shaft in said given direction to retard rotation of said output shaft and stop the load.

2. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second actuators and means responsive to activation thereof for respectively engaging said first and second clutches, first and second activating means for selectively activating said first and second actuators, means for sensing and signaling when said output shaft is turning in a given direction with a speed greater than a predetermined value, inhibit means responsive to signaling by said sensing means for disabling that means for activating the actuator which causes said transmission to drive said output shaft in a direction opposite to said given direction, means for rendering said inhibit means inoperative if said actuator is activated prior to signaling by said sensing means, indicating means for sensing and signaling the occurrence of an operating condition of said system making it necessary to shift in the direction opposite to said given direction, and means responsive to signaling by said indicating means for disabling said inhibit means.

3. In a system for driving a ground wheel of a vehicle from a prime mover, the combination comprising a transmission having input and output shafts coupled respectively to the prime mover and the ground wheel, said transmission having first and second clutches respectively engageable to drive the output shaft in the forward and reverse direction relative to the direction of rotation of the input shaft, first and second fluid actuators responsive to pressure fluid supplied thereto for respectively engaging said first and second clutches, a first hydraulic pump having an inlet and outlet and connected to be driven directly by the prime mover, a reversible second hydraulic pump having an inlet and outlet and connected to be driven directly by the ground wheel and supply an output flow in a direction corresponding to the direction said ground wheel is turning, a selector valve including conduit means connected to said first and second fluid actuators and adapted to selectively direct conduit pressure fluid to one or the other of said actuators to shift the drive direction of said transmission, pressure sensing means adapted to generate a first signal when the output pressure of said first pump is above a predetermined value, a source of hydraulic fluid including means to supply fluid to said pump inlets, an unloading valve adapted to receive pressure fluid from said first and second pump outlets and connect said first pump outlet to said selector valve and said second pump outlet to said source in response to receiving said first signal and connect said second pump outlet to said selector valve and said first pump outlet to said source in the absence of said first signal, flow sensing means connected to sense the direction of fluid flow through said second pump and supply a second signal responsive to the direction of flow, inhibit means acting in response to said second signal to prevent engagement of the clutch for shifting the transmission to a drive direction opposite the direction the wheel is turning when said second signal is supplied, and means for disabling said inhibit means if said clutch for shifting the transmission to the opposite drive direction is already engaged when said second signal is supplied.

4. In a system for driving a load by a prime mover, the combination comprising a transmission having input and output shafts coupled respectively to the prime mover and the load, said transmission having drive means engageable to produce drive of said output shaft in a given direction, an actuator and means responsive to activation thereof to engage said drive means, a first activating fluid pump coupled to be driven by the prime mover, a second activating fluid pump coupled to be driven when the load is being driven in a direction opposite said given direction, an activating fluid system including means for selectively activating said actuator to produce drive through said transmission, fluid sensing means for measuring the output from said first fluid pump and generating a signal when the output is above a predetermined value, fluid valve means acting in response to said signal to connect said first pump to said fluid system when receiving said signal and connect said second pump to said fluid system when not receiving said signal, fluid flow sensing means for detecting fluid flow from said second pump indicating said load is being driven in the direction opposite to said given direction and generating a second signal responsive thereto, inhibit means acting in response to said second signal to prevent engagement of said drive means and thereby prevent drive of the load in the direction opposite to the direction it is then being driven, and means to disable said inhibit means so long as said drive means is engaged prior to said fluid flow sensing means generating said second signal.

5. In a system for driving a ground wheel of a vehicle from a prime mover, the combination comprising a transmission having input and output shafts coupled respectively to the prime mover and the ground wheel, said transmission having first and second clutches respectively engageable to drive the output shaft in the forward and reverse direction relative to the direction of rotation of the input shaft, first and second fluid actuators responsive to pressure fluid supplied thereto for respectively engaging said first and second clutches, a first hydraulic pump having an inlet and outlet and connected to be driven directly by the prime mover, a reversible second hydraulic pump having an inlet and outlet and connected to be driven directly by the ground wheel and produce a fluid flow in a direction corresponding to the direction said ground wheel is turning, a selector valve including conduit means connected to said first and second fluid actuators to selectively supply conduit pressure fluid to one or the other of said actuators to shift the drive direction of said transmission, pressure sensing means for sensing and generating a first signal when the output pressure of said first pump is above a predetermined value, a source of hydraulic fluid including means to supply fluid to said pump inlets, an unloading valve connected to receive pressure fluid from said first and second pump outlets and operable to connect said first pump outlet to said selector valve and said second pump outlet to said source in response to receiving said first signal and to connect said second pump outlet to said selector valve and said first pump outlet to said source in the absence of said first signal, said unloading valve being connected to receive pressure fluid from said second pump outlet when said second pump is being driven in either direction, flow sensing means for sensing the direction of fluid flow through said second pump and supplying a second signal responsive to the direction of flow, and means acting in response to said second signal to prevent engagement of the clutch for shifting the transmission to a drive direction opposite the direction the wheel is then turning.

6. In a system for driving a ground wheel of a vehicle from a prime mover, the combination comprising a transmission having input and output shafts coupled respectively to the prime mover and the ground wheel, said transmission having means including a clutch engageable to drive the output shaft in a first direction with respect to the input shaft, an actuator for engaging said clutch in response to receiving activating fluid, a first activating fluid pump coupled to be driven by the prime mover, a second activating fluid pump coupled to be driven by the ground wheel, an activating fluid system including means to selectively supply activating fluid to said actuator, sensing means for measuring and signaling if the output produced by said first pump is above a predetermined value, means to connect said first pump only to said activating fluid system in response to said sensing means signal and connect said second pump only to said activating fluid system when not receiving said sensing means signal, means to receive the output of said second pump and produce a second signal when said ground wheel is being driven in a second direction opposite to said first direction, inhibit means acting in response to said second signal to prevent the supplying of activating fluid to said actuator and thereby prevent said transmission from being shifted to drive the ground wheel in said first direction, and means for disabling said inhibit means when said transmission already is shifted to drive the ground wheel in said first direction when said second signal is produced.

7. In a system for driving a ground wheel of a vehicle from a prime mover, the combination comprising a transmission having input and output shafts coupled respectively to the prime mover and the wheel, said transmission having means including first and second clutches respectively engageable to drive the output shaft in a forward and reverse direction relative to the input shaft, first and second fluid actuators responsive to pressure fluid supplied thereto for respectively engaging said first and second clutches, a fluid conduit, a first hydraulic pump driven by the prime mover to supply pressure fluid to said fluid conduit, a control valve connected to receive and selectively conduct pressure fluid from said pump, through said conduit, and to said first or second fluid actuators to shift the drive direction of the transmission, an inhibit control including means responsive to a signal indicating the direction the ground wheel is moving for blocking the conduction of pressure fluid to that actuator for shifting the transmission in the opposite direction, a second reversible hydraulic pump driven by the ground wheel to supply a fluid flow in a direction corresponding to the direction of rotation of the ground wheel, means receiving fluid from said second pump and operable to detect the direction said pump is turning for supplying said signal indicating the direction the wheel is moving to said inhibit control, pressure sensing means for signaling when the output pressure of said first pump falls below a predetermined value, and valve means to disconnect said first pump and connect said second pump to said fluid conduit in response to said signal from the pressure sensing means, said valve means being operable to connect said second pump to said fluid conduit regardless of the direction the second pump is turning.

8. In a system for driving a load from a prime mover, the combination comprising a transmission having input and output shafts coupled respectively to the prime mover and the load, said transmission having drive means engageable to establish a plurality of forward and reverse drive ratios between the input and output shafts, a control member movable to a plurality of positions each corresponding to a different drive ratio of said transmission, means responsive to each positioning of said control member for engaging selected ones of said drive means to set the transmission in the drive ratio corresponding to the control member position, means for sensing and producing a signal when the output shaft is turning in a given direction and above a predetermined speed, inhibit means responsive to said signal to delay engagement of those ones of the selected drive means which set the transmission to a drive ratio for driving the output shaft in the direction opposite to said given direction so long as said shaft is rotating in said given direction and above said predetermined speed, and means to disable said inhibit means so long as the selected drive means is engaged prior to said inhibit means receiving said signal.

9. In a system for powering a drive wheel of a vehicle from a prime mover, the combination comprising a clutch drivingly interposed between the prime mover and the wheel, a hydraulic actuator for engaging the clutch when supplied with pressure fluid having a predetermined pressure, a first hydraulic pump driven by the prime mover, a reversible second hydraulic pump driven by the drive wheel, a fluid source including means to conduct fluid to said first and second pumps, a fluid pressure actuated valve connected to receive fluid from said first and second pumps and deliver fluid to said actuator, said valve being connected to receive fluid from said second pump in both directions of operation of said second pump said valve including means to compare the pressure of the fluid received from said first pump and said second pump and actuate said valve from a first state to a second state when the pressure of the fluid received from said first pump exceeds the pressure of the fluid received from said second pump by a predetermined amount, and said valve including means to connect said second pump to said hydraulic actuator when in the first state and to connect said first pump to said hydraulic actuator and the output of said second pump to said source when in said second state.

10. In a system for powering a drive wheel from a prime mover, the combination comprising a clutch drivingly interposed between the prime mover and the wheel, a hydraulic actuator including means for engaging the clutch when supplied with pressure fluid at a given pressure, a first hydraulic pump driven by the prime mover, a reversible second hydraulic pump driven by the drive wheel for producing an output pressure above said given pressure, a fluid source including means to conduct fluid to said first and second pumps, a fluid valve connected to receive pressure fluid from said first and second pumps and transmit the fluid to said actuator, said valve being connected to receive fluid from said second pump in both directions of operation of said second pump, said valve including means to connect said first pump to said actuator and the output of said second pump to said source when in a first condition and to connect said second pump to said actuator when in a second condition, and means to sense the output fluid pressure from said first pump and set said valve in the first condition when said pressure sensed is above a predetermined amount and in a second condition when said pressure sensed is below said predetermined amount whereby said drive wheel may be powered by some other source and said clutch be engaged by pressure fluid from said second pump to permit the prime mover to be driven by the wheel for starting regardless of which direction the wheel is moving.

11. In a system for driving a load from a prime mover, the combination comprising a transmission having input and output shafts coupled respectively to the prime mover and the load, said transmission having means including first and second drive means engageable to produce forward and reverse drive of said output shaft relative to the direction of rotation of said input shaft, first and second fluid actuators and means responsive to pressure fluid supplied thereto for respectively engaging said first and second drive means, first and second conduits including means to selectively supply pressure fluid thereto connected to said first and second fluid actuators to shift the drive ratio of the transmission, blocking valves in said conduits adapted to prevent fluid flow therethrough in response to receiving a first signal, means to sense and signal when said output shaft is turning in a given direction, means responsive to signaling by said sensing means to transmit said first signal to the blocking valve associated with the conduit and actuator for shifting the transmission to the drive direction opposite to said given direction, a brake system including means for retarding rotation of said output shaft when activated by pressure fluid, a pressure fluid system connected to selectively supply pressure fluid to said brake system means, pressure sensing means for generating a second signal when the fluid pressure in said pressure fluid system drops below a predetermined value, and means acting in response to said second signal to block the transmission of said first signal to the blocking valve.

12. In a system for driving a load from a prime mover, the combination comprising a transmission having input and output shafts coupled respectively to the prime mover and the load, said transmission having drive means engageable to produce forward and reverse direction drive of said output shaft relative to said input shaft, a first activating system for engaging selected drive means to produce drive in a given direction, means to sense and signal when the output shaft is turning in the direction opposite to said given direction, inhibit means responsive to signaling by said sensing means to prevent engagement of said drive means to produce drive in said given direction, a brake system including means to retard rotation of said output shaft, a second activating system for activating said brake system, means to sense when said activating system is inoperative, and means to disable said inhibit means when said second activating system is inoperative.

13. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second fluid actuators and means responsive to pressure fluid supplied thereto for respectively engaging said first and second clutches, first and second fluid conduits connecting with said first and second actuators including means to selectively supply fluid thereto for shifting said transmission by engaging said clutches, first and second blocking valves in said first and second conduits respectively adapted to prevent fluid flow therethrough in response to receiving a predetermined signal, means for sensing and signaling when the output shaft is turning above a predetermined speed in forward or reverse directions respectively, means to supply to said first blocking valve said predetermined signal when said sensing means signals said output shaft is turning in the reverse direction above the predetermined speed, means to supply said predetermined signal to said second blocking valve when said sensing means signals said output shaft is turning in a forward direction above said predetermined speed, a braking system including a hydraulic actuator and means for retarding rotation of said output shaft in response to energization of said actuator, second means to sense and signal when the brake system is inoperative, and means to disable said means to supply said predetermined signal to said blocking valve in response to signaling by said second sensing means.

14. In a system for driving a traction member of a vehicle from a prime mover, the combination comprising a transmission having input and output shafts drivingly coupled to the prime mover and traction member respectively, said transmission having a clutch engageable to drive the output shaft in one direction relative to the direction of rotation of the input shaft, an actuator and means responsive to activation thereof for respectively engaging said clutch, an activating system for activating said actuator, first sensing means for signaling when said output shaft is turning faster than a predetermined speed and in a direction opposite to said one direction, means responsive to signaling by said first sensing means for disabling said activating system for engaging said clutch thereby preventing engagement of said transmission for drive of the vehicle in one direction when it is traveling in the other direction above a predetermined speed, a braking system for selectively retarding said traction member to brake the vehicle, second sensing means for signaling when said braking system is inoperative, and means responsive to signaling by said second sensing means for rendering said disabling means ineffective thereby to permit slowing and stopping of the vehicle when it is rolling in the direction opposite to said one direction by shifting said transmission for drive in said one direction.

15. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second actuators and means responsive to activation thereof for respectively engaging said first and second clutches, means including first and second activating means for selectively activating said first and second actuators, means for sensing and signaling when said output shaft is turning in a given direction with a speed greater than a predetermined value, inhibit means responsive to signaling by said sensing means for disabling that activating means for activating the actuator to cause said transmission to drive said output shaft in a direction opposite to said given direction, indicating means for sensing and signaling the occurrence of an operating condition of the drive system making it advantageous to shift in the direction opposite to said given direction, and means responsive to signaling of said indicating means for disabling said inhibit means.

16. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second fluid actuators responsive to pressure fluid supplied thereto for respectively engaging said first and second clutches, first and second fluid conduits connected with said first and second actuators, a source of pressure fluid, a control valve connected between said first and second conduits and said source of pressure fluid and adapted to be actuated to a first position and connect said first conduit to said source and to a second position to connect said second conduit to said source and thereby shift said transmission to drive said output shaft in forward or reverse directions, a blocking valve in said first and second conduits each adapted to be actuated to the closed position and prevent pressure fluid flow therethrough in response to receiving a second pressure fluid flow, a reversible fluid pump driven by said output shaft and in a direction corresponding to the direction said output shaft is being driven, means responsive to said fluid pump being driven in a forward direction to supply said second pressure fluid flow to said second blocking valve and responsive to said fluid pump being driven in a reverse direction to supply said second pressure fluid flow to said first blocking valve, and means to prevent actuation of said blocking valves if pressure fluid exists in the associated first or second conduit when said second pressure flow is supplied whereby said blocking valves will only prevent flow to that fluid actuator which would shift the transmission to drive the output shaft in a direction opposite to the direction it is now being driven if and so long as that fluid actuator is not already supplied pressure fluid for engaging the associated transmission clutch.

17. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second fluid actuators responsive to pressure fluid supplied thereto for respectively engaging said first and second clutches, first and second fluid conduits connecting with said first and second actuators respectively and including means to selectively supply pressure fluid thereto for shifting said transmission by engaging said clutches, first and second blocking valves in said first and second conduits respectively and operable when actuated to close and prevent fluid flow through the associated conduit, means for sensing and signaling when the output shaft is turning above a predetermined speed in forward or reverse directions respectively, means to actuate said first blocking valve when said shaft is turning in the reverse direction above the predetermined speed and means to actuate said second blocking valve when said shaft is turning in the forward direction above the predetermined speed, and means to prevent actuation of the blocking valve if and so long as pressure fluid exists in the conduit associated with the blocking valve being actuated whereby said blocking valves will close when actuated and prevent the shifting of the transmission to drive the output shaft in a direction opposite to that it is now being driven in only if the transmission has not already been shifted to drive in that direction.

18. In a system for driving a load from a prime mover, the combination comprising, a transmission having input and output shafts coupled respectively to the prime mover and the load, said transmission having means including first and second clutches respectively engageable to drive the output shaft in the forward or reverse direction of rotation with respect to the input shaft, means for sensing and signaling when said output shaft is turning above a predetermined speed in the forward direction, first and second actuators and means responsive to activation thereof for respectively engaging said first and second clutches, means including first and second activating systems for respectively activating said first and second actuators, inhibitor means responsive to signaling by said sensing means for disabling said second activating system, and means for rendering said inhibitor means ineffective if said second clutch is engaged prior to signaling by said sensing means.

19. In a system for driving a load from a prime mover, the combination comprising a transmission having input and output shafts coupled respectively to the prime mover and the load, said transmission having means including a clutch engageable to drive the output shaft in one direction relative to the direction of rotation of the input shaft, means for sensing and signaling when said output shaft is turning above a predetermined speed in the other direction, an actuator responsive to activation thereof for engaging said clutch, a movable control member, means including an activating system operable in response to movement of said control member for selectively activating said actuator, inhibitor means responsive to signaling by said sensing means for disabling said activating system while leaving said control member free to move, and means for rendering said inhibitor means ineffective if said actuator is activated prior to signaling by said sensing means.

20. In a system for driving a load from a prime mover, the combination comprising a transmission having input and output shafts coupled respectively to the prime mover and the load, said transmission having drive means engageable to produce drive of said output shaft in a predetermined direction relative to the direction of rotation of said input shaft, an actuator responsive to activation thereof for engaging said drive means, a movable control member, means responsive to movement of said control member for activating said actuator, means for sensing and signaling when said output shaft is turning in the direction opposite said predetermined direction and with a speed greater than a predetermined value, inhibitor means responsive to signaling by said sensing means for disabling said activating means while leaving said control member free to move thereby to prevent said transmission from being engaged to drive said output shaft in a direction opposite to the direction the shaft is then being driven in even if the control member is moved, and means to render said inhibitor means ineffective if said actuator is already activated prior to signaling by said sensing means.

21. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second fluid actuators responsive to pressure fluid supplied thereto for respectively engaging said first and second clutches, first and second fluid conduits connected with said first and second actuators, a source of pressure fluid, a control valve connected between said first and second conduits and said source of pressure fluid and operable when actuated to a first position to connect said first conduit to said source and when actuated to a second position to connect said second conduit to said source to thereby shift said transmission by engagement of the respective clutches to drive said output shaft in forward or reverse direction respectively, blocking valves in said first and second conduits and actuated to the closed position to prevent pressure fluid flow therethrough in response to a second pressure fluid flow thereto, a reversible fluid pump driven by said output shaft, and means responsive to said fluid pump being driven in a forward direction to supply said second pressure fluid flow to said second blocking valve and responsive to said fluid pump being driven in a reverse direction to supply said second pressure fluid flow to said first blocking valve whereby said blocking valves will prevent flow to that fluid actuator for shifting the transmission to drive the output shaft in a direction opposite to the direction it is now being driven.

22. In a system for driving a load from a prime mover, the combination comprising a transmission having input and output shafts coupled respectively to the prime mover and the load, said transmission having means including first and second clutches respectively engageable to produce forward and reverse drive of said output shaft relative to the direction of rotation of said input shaft, first and second fluid actuators responsive to pressure fluid supplied thereto for respectively engaging said first and second clutches, first and second fluid conduits connecting with said first and second actuators and including means to selectively supply pressured fluid thereto for shifting said transmission by engaging said clutches, first and second blocking valves in said first and second conduits respectively for preventing fluid flow therethrough in response to receiving a predetermined signal, means for sensing and signaling when the output shaft is turning above a predetermined speed in forward or reverse directions respectively, means to supply said first blocking valve with said predetermined signal when said sensing means signals said output shaft is turning in the reverse direction above the predetermined speed, and means to supply said second blocking valve with said predetermined signal when said sensing means signals said output shaft is turning in the forward direction above the predetermined speed whereby each blocking valve will close upon receipt of said predetermined signal and prevent the shifting of the transmission to drive the output shaft in a direction opposite to that it is now being driven.

References Cited

UNITED STATES PATENTS

| | | |
|---|---|---|
| 2,726,746 | 12/1955 | Herndon et al. |
| 2,736,412 | 2/1956 | Livezey. |
| 2,845,817 | 8/1958 | Polmoski. |
| 2,972,224 | 2/1961 | Forster. |
| 2,979,963 | 4/1961 | Snoy. |

FOREIGN PATENTS 916,731  1/1963  Great Britain.

BENJAMIN W. WYCHE III, *Primary Examiner.*